United States Patent
Zhao et al.

(10) Patent No.: US 11,558,605 B2
(45) Date of Patent: Jan. 17, 2023

(54) VIDEO CODING METHOD AND SYSTEM BASED ON MULTIPLE REFERENCE LINE INTRA PREDICTION

(71) Applicant: Tencent America LLC, Palo Alto, CA (US)

(72) Inventors: Liang Zhao, Sunnyvale, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/077,872

(22) Filed: Oct. 22, 2020

(65) Prior Publication Data

US 2021/0235071 A1     Jul. 29, 2021

Related U.S. Application Data

(60) Provisional application No. 62/964,992, filed on Jan. 23, 2020.

(51) Int. Cl.
*H04N 19/105*     (2014.01)
*H04N 19/132*    (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .... H04N 19/105; H04N 19/46; H04N 19/132; H04N 19/159; H04N 19/80; H04N 19/176
See application file for complete search history.

(56) References Cited

U.S. PATENT DOCUMENTS

| | | |
|---|---|---|
| 2015/0023405 A1 | 1/2015 | Joshi et al. |
| 2018/0146211 A1 | 5/2018 | Zhang et al. |

(Continued)

FOREIGN PATENT DOCUMENTS

| | | | |
|---|---|---|---|
| WO | 2019155451 A1 | 8/2019 | |
| WO | 2019194950 A1 | 10/2019 | |
| WO | WO-2020130629 A1 * | 6/2020 | ............. H04N 19/70 |

OTHER PUBLICATIONS

Peter De Rivaz et al., "AV1 Bitstream & Decoding Process Specification," The Alliance for Open Media, 2018, [online] Available: https://aomediacodec.github.io/av1-spec/av1-spec.pdf. 681 pages.
(Continued)

*Primary Examiner* — Francis Geroleo
(74) *Attorney, Agent, or Firm* — Anova Law Group PLLC

(57) ABSTRACT

A video decoding method includes: obtaining a bitstream including a plurality of coded frames of a video signal; decoding each of the plurality of coded frames into a plurality of super blocks and each of the plurality of super blocks into a plurality of residual blocks; recovering a coded block (CB) for each of the plurality of residual blocks based on multiple reference line intra prediction (MRLP) flags and reference samples included in each coded frame, wherein multiple reference lines are divided into above-side reference lines and left-side reference lines and one above-side reference line and one left-side reference line are selected for intra prediction; reconstructing each frame of the video signal by storing the recovered CB for each of the plurality of residual blocks in a frame buffer; and continuously outputting the reconstructed frames to restore the video signal.

15 Claims, 15 Drawing Sheets

(51) Int. Cl.
 H04N 19/176 (2014.01)
 H04N 19/80 (2014.01)
 H04N 19/159 (2014.01)
 H04N 19/46 (2014.01)
(52) U.S. Cl.
 CPC .......... *H04N 19/176* (2014.11); *H04N 19/46* (2014.11); *H04N 19/80* (2014.11)

(56) References Cited

U.S. PATENT DOCUMENTS

| | | | |
|---|---|---|---|
| 2018/0332284 A1* | 11/2018 | Liu | H04N 19/182 |
| 2019/0238835 A1 | 8/2019 | Lee | |
| 2019/0306494 A1 | 10/2019 | Chang et al. | |
| 2019/0335199 A1 | 10/2019 | Joshi et al. | |
| 2020/0404281 A1* | 12/2020 | Ramasubramonian | H04N 19/176 |

OTHER PUBLICATIONS

Liang Zhao et al.,. "CE3-related: Intra mode coding," Joint Video Experts Team (JVET) of ITU-T SG 16 WP 3 and ISO/IEC JTC 1/SC 29/WG 11, Oct. 2018, JVET-L0280-r1. 3 pages.

Yue Chen et al., "An Overview of Core Coding Tools in the AV1 Video Codec," 2018 Picture Coding Symposium (PCS), pp. 41-45, Jun. 2018. 5 pages.

Benjamin Bross et al., "CE3: Multiple reference line intra prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, Oct. 2018, JVET-L0283. 6 pages.

Benjamin Bross et al., "CE3: Multiple reference line intra prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, Oct. 2018, JVET-L0283-v2. 7 pages.

Benjamin Bross et al., "Versatile Video Coding (Draft 2)," Joint Video Experts Team (JVET) of ITU-T SG 16 WP 3 and ISO/IEC JTC 1/SC 29/WG 11, Jul. 2018, JVET-K1001-v6. 141 pages.

Benjamin Bross et al., "Versatile Video Coding (Draft 4)," Joint Video Experts Team (JVET) of ITU-T SG 16 WP 3 and ISO/IEC JTC 1/SC 29/WG 11, Jan. 2019, JVET-M1001-v7. 300 pages.

The World Intellectual Property Organization (WIPO) International Search Report for PCT/US21/13330 dated Mar. 31, 2021 2 Pages.

Japan Patent Office (JPO) The Office Action for JP Application No. 2021-563217 dated Nov. 1, 2022 11 Pages (Translation Included).

Liang Zhao et al., "Further investigations on multi-line intra prediction", Apr. 2018. pp. 1-3. Joint Video Exploration Team (JVET) if ITU-T SG 16 WP 3 and ISO/IEC JTC 1/SC 29/WG 11, JVET-J0065-v2, 10th Meeting: San Diego, US.

Benjamin Bross et al., "Wiegand, CE3: Multiple reference line intra prediction (Test 5.4.1, 5. 4.2, 5.4.3 and 5.4.4)", Jul. 2018, pp. 1-8. Joint Video Experts Team (JVET) of ITU-T SG 16 WP 3 and ISO/IEC JTC 1/SC 29/WG 11, JVET-K0051-V1, 11TH Meeting: Ljubljana, SI.

* cited by examiner

VIDEO CODING METHOD AND SYSTEM BASED ON MULTIPLE REFERENCE LINE INTRA PREDICTION

RELATED APPLICATIONS

This application claims priority to U.S. provisional patent application No. 62/964,992, filed on Jan. 23, 2020, content of which is incorporated by reference in its entirety.

FIELD OF THE TECHNOLOGY

This application relates to the field of video coding technologies and, specifically, to a method and system of video coding with multiple reference line intra prediction.

BACKGROUND OF THE DISCLOSURE

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

Multiple reference line prediction (MRLP) is used in video coding schemes of both video coding standards. The MRLP result is stored in a line buffer. The line buffer is a typical and major on-chip memory design architecture for image/video processing circuits. As the line buffer usually occupies very large on-chip circuit area, it is of great importance to reduce its hardware cost through efficient architecture design. For MRLP, more than one (e.g., 4) reference line may be used for intra prediction so that the line buffer size is increased, which costs a lot of on-chip circuit areas.

The disclosed methods and systems are directed to solve one or more problems set forth above and other problems.

SUMMARY

One aspect of the present disclosure includes a video decoding method. The method includes: obtaining a bitstream including a plurality of coded frames of a video signal; decoding each of the plurality of coded frames into a plurality of super blocks and each of the plurality of super blocks into a plurality of residual blocks; recovering a coded block (CB) for each of the plurality of residual blocks based on multiple reference line intra prediction (MRLP) flags and reference samples included in each coded frame, wherein multiple reference lines are divided into above-side reference lines and left-side reference lines and one above-side reference line and one left-side reference line are selected for intra prediction; reconstructing each frame of the video signal by storing the recovered CB for each of the plurality of residual blocks in a frame buffer; and continuously outputting the reconstructed frames to restore the video signal.

Another aspect of the present disclosure includes a video encoding method. The method includes: obtaining a current frame of a video input; according to a nested multi-type tree coding block structure, dividing the obtained current frame into a sequence of super blocks, and splitting each super block into a plurality of coded blocks (CBs); using multiple reference line intra prediction (MRLP) to obtain a residual block for each CB and storing MRLP flags and reference samples of reference lines selected for intra prediction in a line buffer, wherein multiple reference lines are divided into above-side reference lines and left-side reference lines and one above-side reference line and one left-side reference are selected for intra prediction to minimize the size of the line buffer; and coding the current frame by using the residual block for each CB of the current frame to generate a bitstream including the coded residual block for each CB.

Other aspects of the present disclosure can be understood by those skilled in the art in light of the description, the claims, and the drawings of the present disclosure.

DESCRIPTION OF EMBODIMENTS

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Versatile Video Coding (VVC): VVC is a video decoding standard developed by the Joint Video Exploration Team (WET) to succeed the HEVC (also known as ITU-T H.265). VVC specifies a video coding technology with a compression capability that is substantially beyond that of the prior generations of such standards and is highly versatile for effective use in a broadened range of applications. VVC standard is incorporated herein by reference.

AOMedia Video 1 (AV1): AV1 is an open-source video coding standard developed by the Alliance for Open Media (AOMedia) for video transmissions over the Internet. AV1 standard is incorporated herein by reference.

Allowed intra prediction modes (AIPM): defined as one mode set with modes that can be used for intra prediction of current block derived according to the intra prediction modes of neighboring blocks.

Disallowed intra prediction modes (DIPM): defined as one mode set with modes that cannot be signaled or used for intra prediction of current block and derived according to the intra prediction modes of neighboring blocks.

Chroma from Luma (CfL): CfL takes advantages of correlations between the luminosity and the color information to perform intra prediction for a chroma component based on reference samples of a luma component of a same coding block.

Multiple reference line intra prediction (MRLP): MRLP uses not only the nearest reference line but also multiple reference lines farther away from a current coding block in intra prediction.

Coding tree unit (CTU): CTU is a basic processing unit of various video coding schemes of HEVC and VVC standards. A video frame is divided into a plurality of CTUs and each CTU is further divided into various smaller units or blocks for effective video coding. In the video coding scheme of AV1 standard, a structure equivalent to the CTU is called a super block.

Context-based Adaptive Binary Arithmetic Coding (CABAC): CABAC is a form of entropy coding used in various video coding standards.

Versatile video coding Test Model (VTM): VTM provides an encoder side description of VVC algorithm and the test procedures.

Bjontegaard delta rate (BDR or BD-rate): BDR is a method of evaluating coding efficiency by measuring bit-rate changes for a same peak signal-to-noise ratio (PSNR) of video signals.

Figure 1:
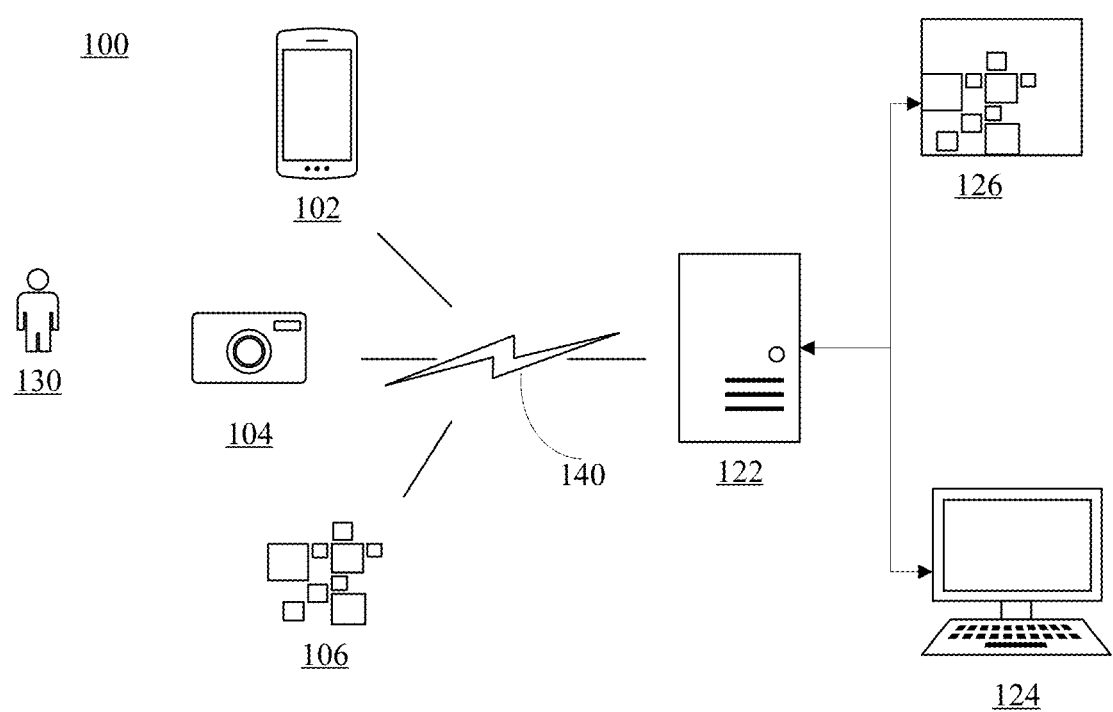
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an internet of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
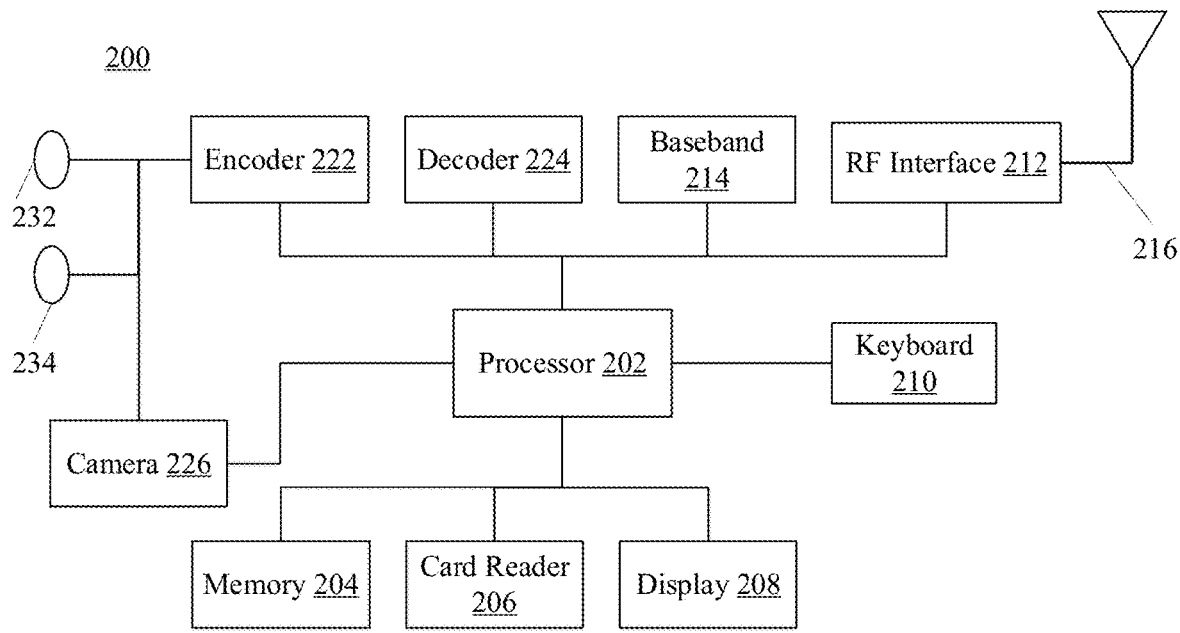
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), an application specific integrated circuit (ASIC), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user 130, and may also include other types of input/output devices. The speaker 232 and the microphone 234 may be used to input and output audio for the electronic device 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user 130, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
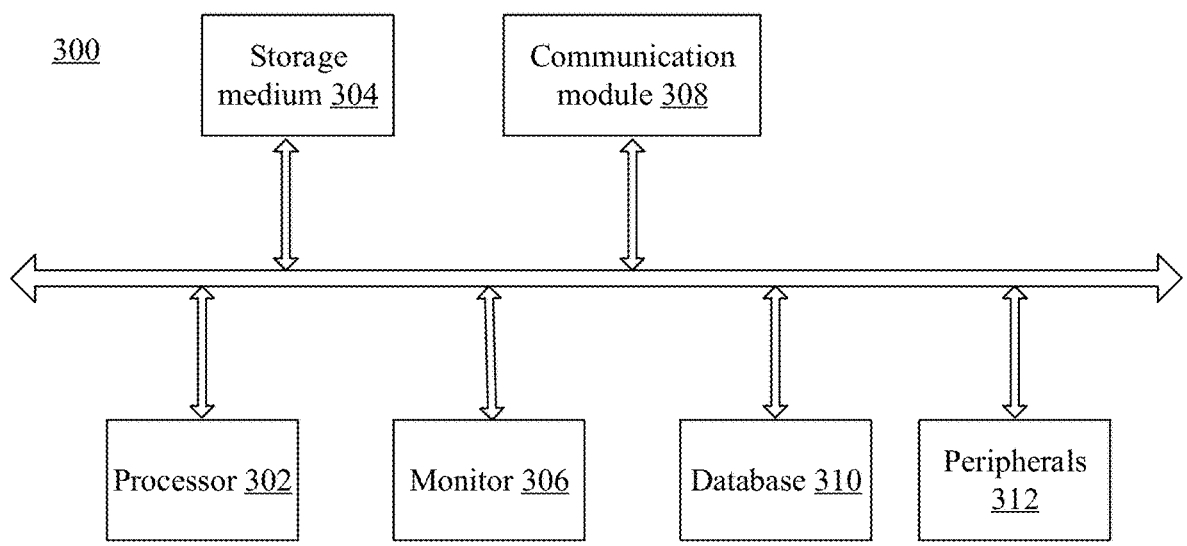
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. FIG. 3 illustrates an exemplary computer system implementing certain aspects of server 122.

As shown in FIG. 3, the computer system 300 may include a processor 302, storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, erasable and rewritable memory, and mass storages, such as CD-ROM, U-disk, and hard disk, etc. Storage medium 304 may store computer programs for implementing various processes, when executed by processor 302.

Further, the peripherals 312 may include I/O devices such as a keyboard and a mouse. The communication module 308 may include network devices for establishing connections through the communication network. The database 310 may include one or more databases for storing certain data and for performing certain operations on the stored data, such as database searching.

Figure 4:
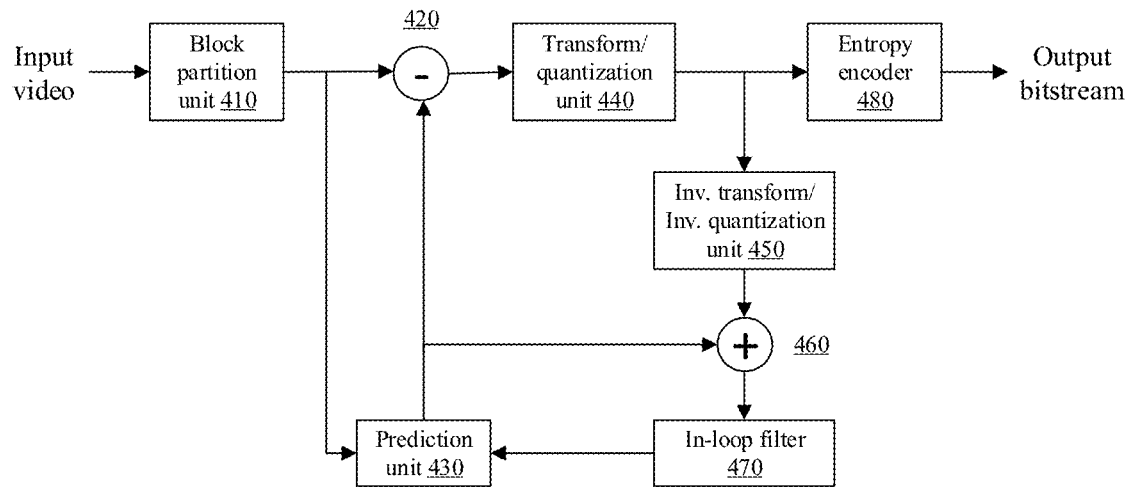
FIG. 4 illustrates a video encoder consistent with embodiments of the present disclosure.

Returning to FIG. 2, the encoder 222 may be an encoder implementing a method of intra mode coding. In this case, the electronic device 200 may also be considered to implement the method of intra mode coding. That is, the encoder 222 may be implemented as a hardware circuitry in the electronic device 200, or may be implemented as a software program by the electronic device 200, or a combination of the hardware circuitry and the software program. FIG. 4 illustrates an exemplary video encoder consistent with the disclosed embodiments of the present disclosure.

As shown in FIG. 4, the video encoder 400 includes a block partition unit 410, a subtraction unit 420, a prediction unit 430, a transform/quantization unit 440, an inverse quantization/inverse transform unit 450, an addition unit 460, an in-loop filter 470, and an entropy encoder 480. An input video is inputted into the video encoder 400 and in response, the video encoder 400 outputs a bitstream.

The input video includes a plurality of picture frames. Each picture frame is divided into a sequence of super blocks or coding tree units (CTUs) by the block partition unit 410. For a picture frame that has three sample arrays, a super block or a CTU consists of an N×N block of luma samples together with two corresponding M×M blocks of chroma samples. The block partition unit 410 further splits the CTU into coding units (CUs) by using a nested multitype tree using binary and ternary splits structure denoted as coding tree to adapt to various local characteristics. The decision whether to code a picture area using inter-picture (temporal) or intra-picture (spatial) prediction is made at a leaf CU level of the coding tree. Prediction process is applied to the leaf CU to obtain a residual block, transformation may be applied to the residual block, and the relevant information is transmitted to a corresponding decoder on a CU basis. After obtaining a residual block by applying the prediction process, a leaf CU can be partitioned into transform units (TUs) by another tree structure for residual coding with or without transformation.

The prediction unit 430 supports intra prediction, inter prediction, and combined inter and intra prediction. The intra prediction is also called intra mode coding. To capture the arbitrary edge directions presented in a natural video, the prediction unit 430 supports 65 directional (or angular) intra-prediction modes in addition to planar (surface fitting) intra-prediction mode and DC (flat) intra-prediction mode. The prediction unit 430 further supports inter-predicted sample generation based on motion parameters including motion vectors, reference picture indices and reference picture list usage index, and additional information needed for video coding features. The prediction unit 430 also supports a skip mode where the CU coded in the skip mode is associated with one PU and has no significant residual coefficients, no coded motion vector delta or reference picture index. The prediction unit 430 also supports a merge mode where the motion parameters for the current CU are obtained from neighboring CUs, including spatial and temporal candidates, and additional schedules. The merge mode can be applied to any inter-predicted CU, not only for the skip mode. The prediction unit 430 also supports an alternative to the merge mode by explicitly transmitting motion parameters, where the motion vector, the corresponding reference picture index for each reference picture list and reference picture list usage flag, and other needed information are signaled explicitly per each CU.

The subtraction unit 420 outputs a difference (or a residual) between the CU and the PU to the transform/quantization unit 440.

The transform/quantization unit 440 supports large block-size transforms up to 64×64 in size. High frequency transform coefficients are zeroed out for the transform blocks with size equal to 64, so that only the lower-frequency coefficients are retained. When transforming a large block in the skip mode, the transform/quantization unit 440 uses the entire block without zeroing out any values. The transform/quantization unit 440 also supports multiple transform selection (MTS) for core transform. To control the MTS, the transform/quantization unit 440 uses separate enabling flags at a sequence parameter set (SPS) level for intra and inter prediction, respectively. When the MTS is enabled at the SPS level, a CU level flag is signaled to indicate whether the MTS is applied or not. The transform/quantization unit 440 also supports other transform features described in the video coding schemes of the VVC and AV1 standards, such as low-frequency non-separable transform (LFNST) and sub-block transform (SBT).

Further, the transform/quantization unit 440 supports a maximum of 63 quantization parameters (QPs). The transform/quantization unit 440 also supports a flexible luma-to-chroma QP mapping by signaling the luma-to-chroma mapping relationship in the SPS. The transform/quantization unit 440 also supports CU-level QP adaption where delta QP values for luma and chroma components can be signaled separately. The transform/quantization unit 440 also supports other quantization features described in the video schemes of the VVC and AV1 standards, such as dependent quantization.

The transform/quantization unit 440 also supports joint coding of chroma residuals, which is indicated by a TU-level flag.

Context-based Adaptive Binary Arithmetic Coding (CABAC) may be described as the entropy coding algorithm. The entropy encoder 480 includes a CABAC coding engine to encode syntax elements outputted by the transform/quantization unit 440. The CABAC coding engine supports arithmetic coding algorithms such as Golomb-Rice coding algorithm. The entropy encoder 480 supports separate residual coding structures for a transform block and a transform skip block. The entropy encoder 480 codes the transform coefficients of a coding block by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

Each coding block in a transform unit is split into a plurality of sub-blocks and each sub-block is split into a plurality of pixels. The plurality of sub-blocks include 4×4 or 2×2 sub-blocks.

In the arithmetic coding algorithm, a probability model is dynamically selected for each syntax element depending on previously coded information in a local neighborhood.

The inverse quantization/inverse transform unit 450 reverses the quantization process and the transform process performed by the transform/quantization unit 440 and feeds an output to the addition unit 460 to reconstruct the picture frame. The addition unit 460 also takes the output of the prediction unit 430 as another input. The reconstructed picture will be filtered by the in-loop filter 470. The in-loop filter 470 includes a deblocking filter, a sample adaptive offset (SAO) filter, and an adaptive loop filter (ALF), which are cascaded in this order. The output of the in-loop filter 470 is inputted into the prediction unit 430.

Figure 5:
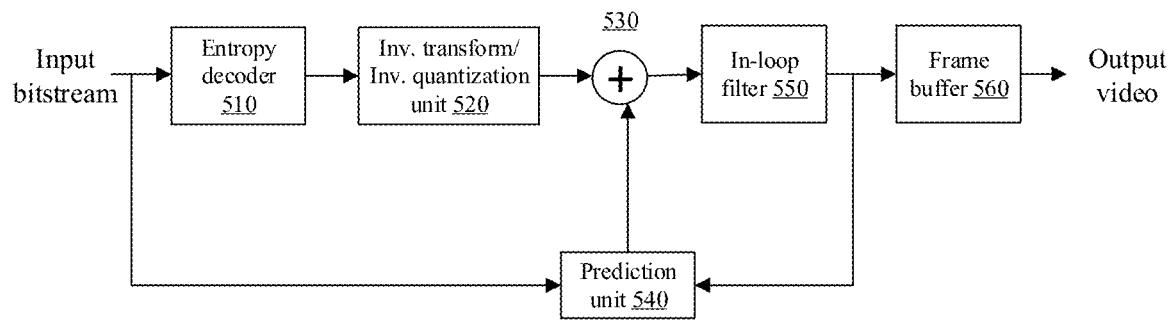
FIG. 5 illustrates a video decoder consistent with embodiments of the present disclosure.

FIG. 5 illustrates a video decoder consistent with embodiments of the present disclosure. As shown in FIG. 5, the video decoder 500 includes an entropy decoder 510, an inverse transform/inverse quantization unit 520, an addition unit 530, a prediction unit 540, an in-loop-filter 550, and a frame buffer 560. An input bitstream outputted from the video encoder 400 shown in FIG. 4 is inputted into the video decoder 500 and in response, the video decoder 500 outputs a video signal. The input bitstream may be transmitted over a communication network before being inputted into the video decoder 500.

The video decoder 500 performs a video decoding process to the input bitstream to reconstruct the picture frames. The video decoding process is a process reversing the video encoding process performed by the video encoder 400. Specifically, the entropy decoder 510 decodes the bitstream encoded by the entropy encoder 480. The inverse transform/inverse quantization unit 520 reverses the transform/quantization process performed by the transform/quantization unit 440 to recover the residual block. The addition unit 530 calculates the sum of the residual block and the predicted block predicted by the prediction unit 540 to recover the coding block. The in-loop filter 550 smooths the recovered coding block. Finally, the coding block is stored into the frame buffer 560 to reconstruct the picture frame.

In the meantime, the prediction unit 540 takes the decoded coding block and various flags in the input bitstream as the inputs to generate the predicted block.

Figure 6:
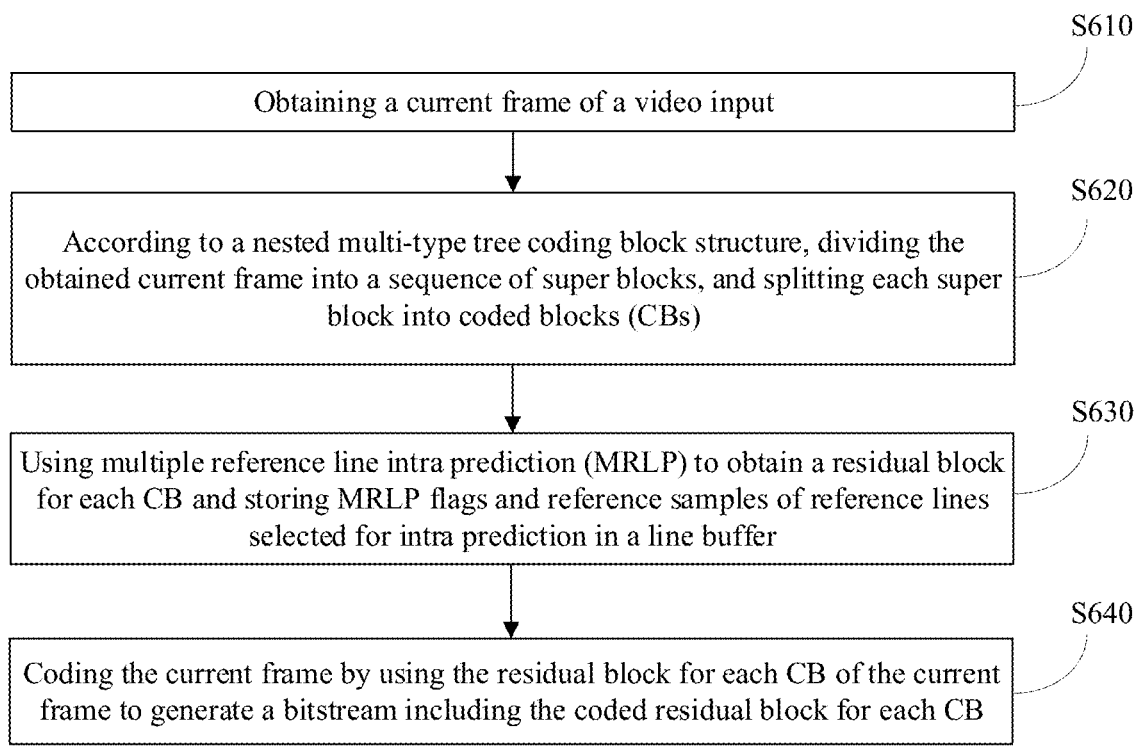
FIG. 6 illustrates an exemplary video encoding method consistent with embodiments of the present disclosure.

The present disclosure provides a video encoding method. FIG. 6 illustrates a flowchart of an exemplary video encoding method consistent with embodiments of the present disclosure. As shown in FIG. 6, the video encoding method includes obtaining a current frame of a video input (at S610). The current frame may be divided into a sequence of super blocks or coding tree units (CTUs) according to a nested multi-type tree coding block structure, each super block or CTU may be further split into coded blocks (CBs) (at S620).

In the video encoding schemes of both HEVC and VVC standards, video frames are divided into a sequence of CTUs. In the video encoding scheme of HEVC standard, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quadtree structure like the coding tree for the CU. One of key features of the HEVC structure is that it has the multiple partition conceptions including CU, PU, and TU.

Figure 8:
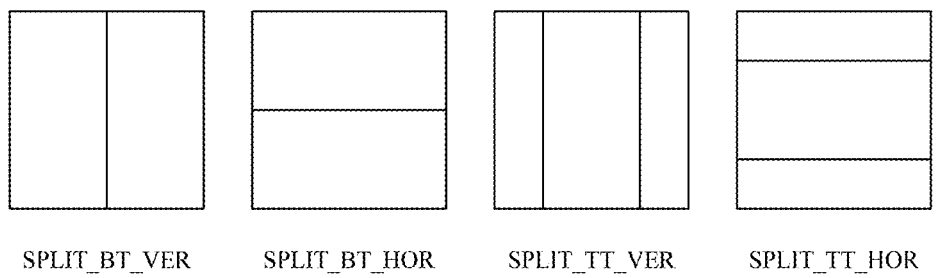
FIG. 8 illustrates four multi-type tree splitting modes consistent with embodiments of the present disclosure.

In the video encoding scheme of VVC standard, a quadtree with nested multi-type tree using binary and ternary splits segmentation structure replaces the concepts of multiple partition unit types, i.e., it removes the separation of the CU, PU and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (a.k.a. quadtree) structure. Then the quaternary tree leaf nodes can be further partitioned by a multi-type tree structure. As shown in FIG. 8, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 9:
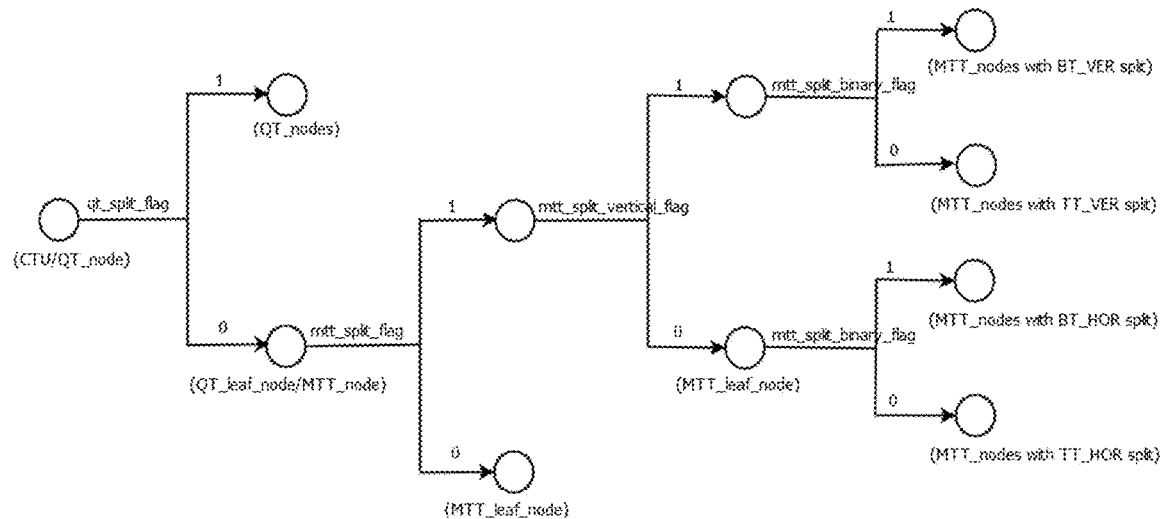
FIG. 9 illustrates signalling mechanism of the partition splitting information in an exemplary coding tree structure consistent with embodiments of the present disclosure.

FIG. 9 illustrates signalling mechanism of the partition splitting information in an exemplary coding tree structure consistent with embodiments of the present disclosure. A CTU is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned. When a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree splitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 10:
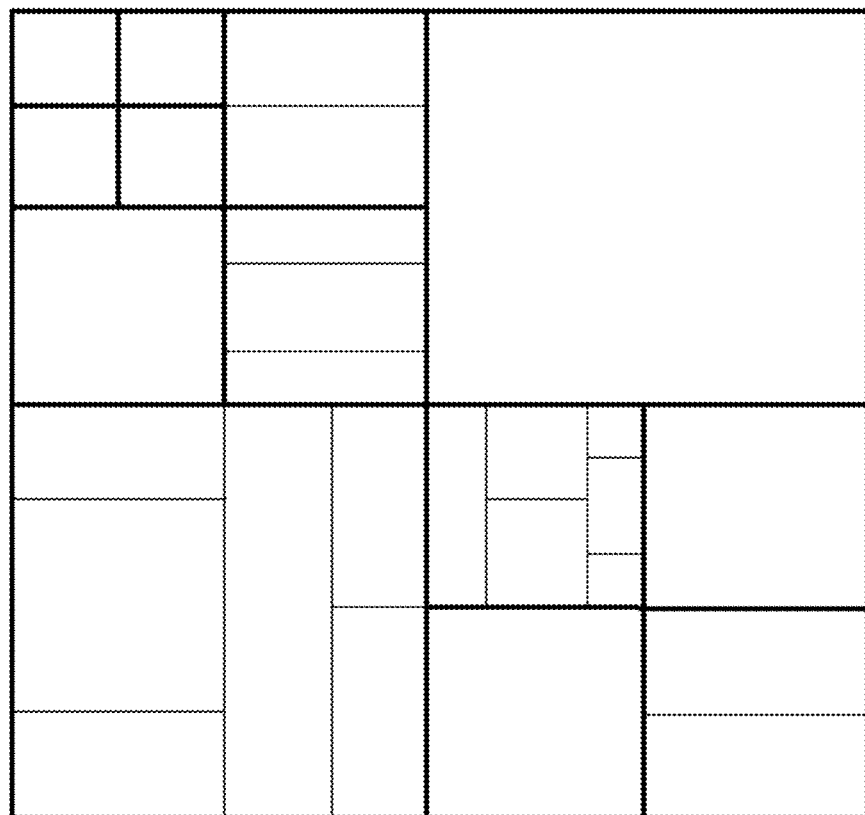
FIG. 10 illustrates an exemplary coding tree structure consistent with embodiments of the present disclosure.

FIG. 10 illustrates an exemplary coding tree structure consistent with embodiments of the present disclosure. As shown in FIG. 10, a CTU may be divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In the video coding scheme of VVC standard, the maximum supported luma transform size is 64×64 and the maximum supported chroma transform size is 32×32. When the width or height of the CB is larger than the maximum transform width or height, the CB is automatically split in the horizontal and/or vertical direction to meet the transform size restriction in that direction.

In the video coding scheme of VVC standard (e.g., VTM7), the coding tree scheme supports the ability for the luma and chroma to have a separate block tree structure. Currently, for P and B slices, the luma and chroma coding tree blocks (CTBs) in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Figure 11:
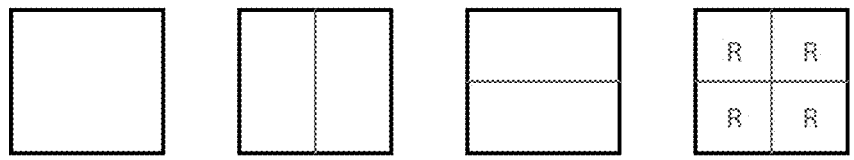
FIG. 11 illustrates another exemplary coding tree structure consistent with embodiments of the present disclosure.

Similarly, in the video coding schemes of VP9 standard, video frames are divided into a sequence of CTUs. As shown in FIG. 11, a 4-way partition tree is used to divide the CTUs from the 64×64 level down to 4×4 level, with some additional restrictions for blocks 8×8. Note that partitions designated as R refer to as recursive in that the same partition tree is repeated at a lower scale until we reach the lowest 4×4 level.

Figure 12:
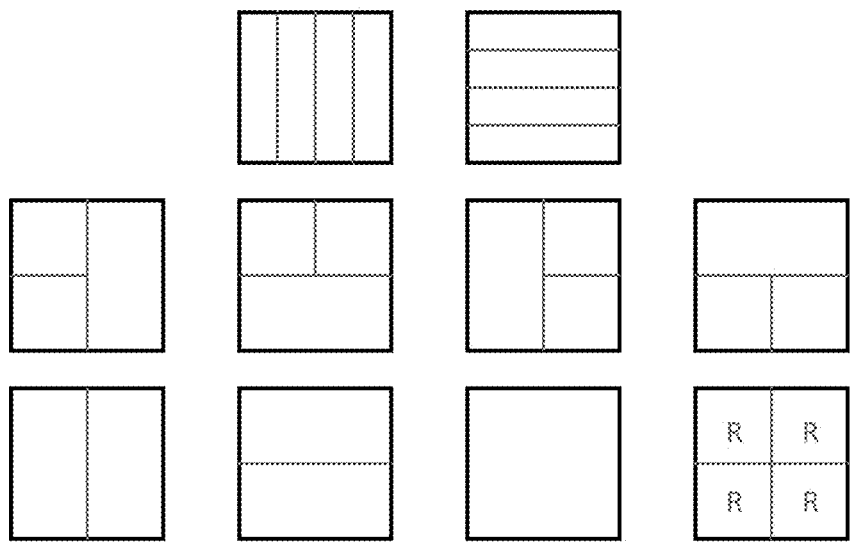
FIG. 12 illustrates another exemplary coding tree structure consistent with embodiments of the present disclosure.

Similarly, in the video coding schemes of AV1 standard, video frames are divided into a sequence of super blocks. As shown in FIG. 12, the partition-tree is expanded to a 10-way structure. At the same time, the largest size (referred to as superblock in VP9/AV1 parlance) is increased to start from 128×128. Note that this includes 4:1/1:4 rectangular partitions that did not exist in the video coding scheme of VP9 standard. None of the rectangular partitions can be further subdivided. In addition to coding block size, coding tree depth is defined to indicate the splitting depth from the root node. To be specific, the coding tree depth for the root node, e.g. 128×128, is set to 0, and after tree block is further split once, the coding tree depth is increased by 1.

Instead of enforcing fixed transform unit sizes, luma coding blocks are allowed to be partitioned into transform units of multiple sizes that can be represented by a recursive partition going down by up to 2 levels. To incorporate extended coding block partitions, square, 2:1/1:2, and 4:1/1:4 transform sizes from 4×4 to 64×64 are supported. For chroma blocks, only the largest possible transform units are allowed.

Returning to FIG. 6, at S630, after the current frame is partitioned to a sequence of the CB, multiple reference line intra prediction (MRLP) is used to obtain a residual block for each CB and MRLP flags and reference samples of reference lines selected for intra prediction are stored in a line buffer.

For each block, intra prediction modes are derived based on multiple reference lines of neighboring blocks. A subset of all available intra prediction modes defined in the video coding scheme based on the AV1 standard is determined for each of the multiple reference lines. The subset of all available intra prediction modes is also called an allowed intra prediction mode (AIPM) set. Each of the multiple reference lines is identified by an index number. The index number is an integer greater than or equal to zero.

In the video encoding scheme of AV1 standard, the number of available intra prediction modes is 62, which includes 56 angular intra prediction modes, 5 smooth modes, and one chroma from luma mode. When multiple reference lines are applied in intra prediction and all the intra prediction modes are included for the multiple reference lines, the video coding complexity is substantial. The multiple reference lines include an adjacent reference line with an index number equal to zero and one or more non-adjacent reference lines with the index numbers greater than zero. The number of the intra prediction modes allowed for each of the reference lines needs to be limited to reduce the video encoding complexity.

Certain restrictions may apply to the MRLP. The MRLP may be disabled for narrow blocks. The narrow blocks has a width W, a height H, and abs($\log_2$ W−$\log_2$H)>1. The MRLP may be disabled for small blocks. The size of the small blocks is 8×8 or less. Other restriction may also apply.

In the embodiments of the present disclosure, MRLP is used in the video encoding method to improve coding efficiency and compression performance. The corresponding intra prediction modes determined for each of the multiple reference lines based on the coding efficiency and compression performance are a subset of all the available intra prediction modes defined in the video coding schemes of various video coding standards. The subset is also called the AIPM set. The intra prediction modes included in the AIPM set are signaled by the video coding device, such as the video encoder 400 shown in FIG. 4. Because the number of the intra prediction modes included in the AIPM set is less than the number of all the available intra prediction modes defined in the corresponding video coding scheme, fewer bits are needed to signal the intra prediction modes included in the AIPM set. Further, the symbol level may be predicted for each block in inter prediction modes in addition to the intra prediction modes.

After the residual block is obtained, the residual block is transformed and quantized. The residual block is a difference between the current CB and the predicted CB.

Figure 13:
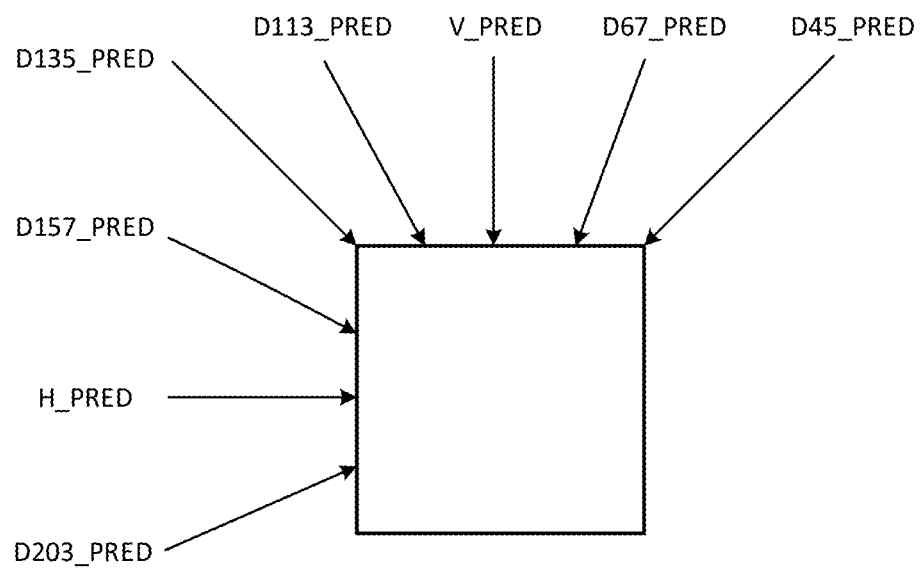
FIG. 13 illustrates 8 nominal angles of the intra prediction modes consistent with embodiments of the present disclosure.

The intra prediction modes in the video encoding scheme of the AV1 standard include 56 angular (or directional) intra prediction modes, 5 non-angular smooth intra prediction modes, one chroma only intra prediction mode, and some other intra prediction modes. Eight directional (or angular) modes correspond to angles from 45 to 207 degrees. To exploit more varieties of spatial redundancy in directional textures, directional intra prediction modes are extended to an angle set with finer granularity. FIG. 13 illustrates 8 nominal angles of the intra prediction modes consistent with embodiments of the present disclosure. As shown in FIG. 13, the angles of the 8 directional modes are slightly changed and made as nominal angles, and these 8 nominal angles are also called nominal intra angles and named as V_PRED, H_PRED, D45_PRED, D135_PRED, D113_PRED, D157_PRED, D203_PRED, and D67_PRED, corresponding to 90°, 180°, 45°, 135°, 113°, 157°, 203°, and 67°. Each nominal angle is extended to 7 finer angles. Thus, 56 directional angles (also known as intra angles or prediction angles) are defined in total. Each prediction angle is presented by a nominal intra angle plus an angle delta, which is −3~3 multiplies the step size of 3 degrees. To implement directional intra prediction modes via a generic way, all the 56 directional intra prediction modes are implemented with a unified directional predictor that projects each pixel to a reference sub-pixel location and interpolates the reference pixel by a 2-tap bilinear filter.

Figure 14:
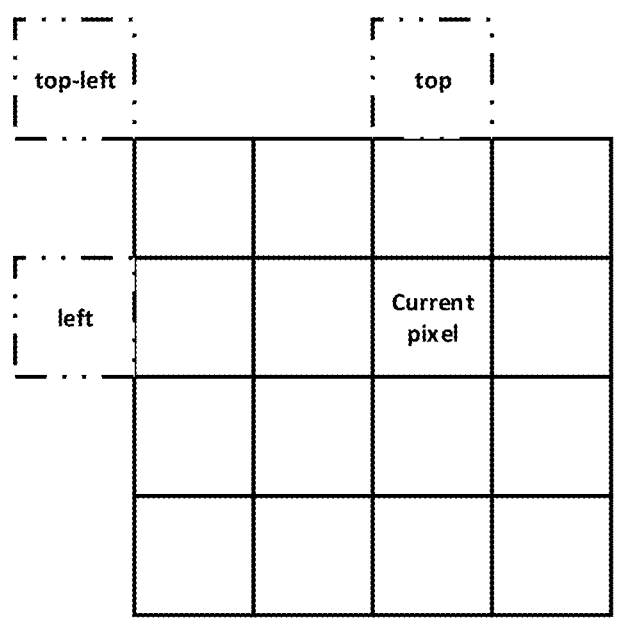
FIG. 14 illustrates top, left, and top-left positions for PAETH mode consistent with embodiments of the present disclosure.

The intra prediction modes also include 5 non-directional smooth intra prediction modes, which are a DC mode, a PAETH mode, a SMOOTH mode, a SMOOTH_V mode, and a SMOOTH_H mode. For the DC mode, the average of left and above neighboring samples is used as the predictor of the block to be predicted. For the PAETH mode, top, left and top-left reference samples are firstly fetched, and then the value which is closest to (top+left−top-left) is set as the predictor for the pixel to be predicted. FIG. 14 illustrates top, left, and top-left positions for PAETH mode consistent with embodiments of the present disclosure. For the SMOOTH mode, the SMOOTH_V mode, and the SMOOTH_H mode, they predict the block using quadratic interpolation in vertical or horizontal directions, or the average in both directions.

Figure 15:
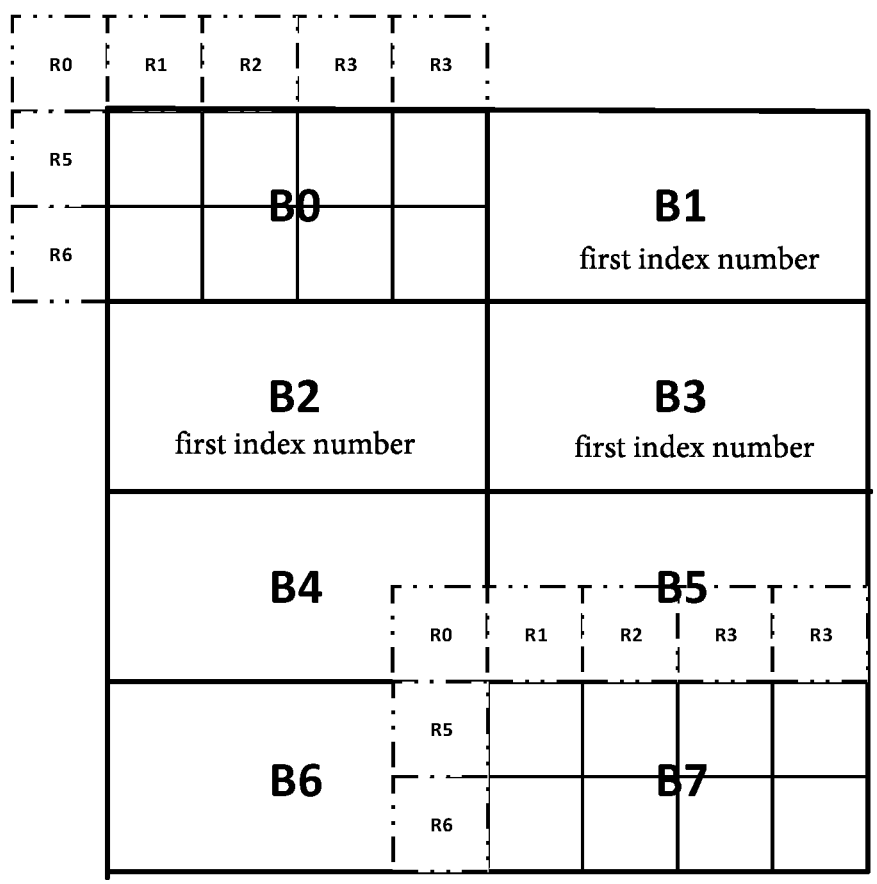
FIG. 15 illustrates examples of recursive intra filtering modes consistent with embodiments of the present disclosure.

To capture decaying spatial correlation with references on the edges, FILTER INTRA modes are designed for luma blocks. Five filter intra modes are defined. Each of the five filter intra modes is represented by a set of eight 7-tap filters reflecting correlation between pixels in a 4×2 patch and 7 adjacent neighbors. In other words, the weighting factors for 7-tap filter are position dependent. FIG. 15 illustrates examples of recursive intra filtering modes consistent with embodiments of the present disclosure. As shown in FIG. 15, an 8×8 block is split into 8 4×2 patches. These patches are indicated by B0, B1, B2, B3, B4, B5, B6, and B7 in FIG. 15. For each patch, 7 adjacent neighbors, indicated by R0~R7, are used to predict the pixels in the current patch. For the patch B0, all the adjacent neighbors are already reconstructed. But for other patches, not all the adjacent neighbors are reconstructed. The predicted values of the adjacent neighbors are used as references. For example, all the adjacent neighbors of the patch B7 are not reconstructed, so the prediction samples of the adjacent neighbors (i.e., B5 and B6) are used instead.

Chroma from Luma (CfL) is a chroma-only intra predictor that models chroma pixels as a linear function of coincident reconstructed luma pixels. The CfL prediction is expressed as follows:

$$CfL(\alpha)=\alpha \times L_{AC}+DC$$

where $L_{AC}$ denotes the AC contribution of the luma component, α denotes the parameter of the linear model, and DC denotes the DC contribution of the chroma component. Specifically, the reconstructed luma pixels are subsampled into the chroma resolution, and then the average value is subtracted to form the AC contribution. To approximate chroma AC component from the AC contribution, instead of requiring the decoder to calculate the scaling parameters, CfL determines the parameter a based on the original chroma pixels and signals them in the bitstream. This approach reduces decoder complexity and yields more precise predictions. As for the DC contribution of the chroma component, it is computed using intra DC mode, which is sufficient for most chroma contents and has mature fast implementations.

Figure 16:
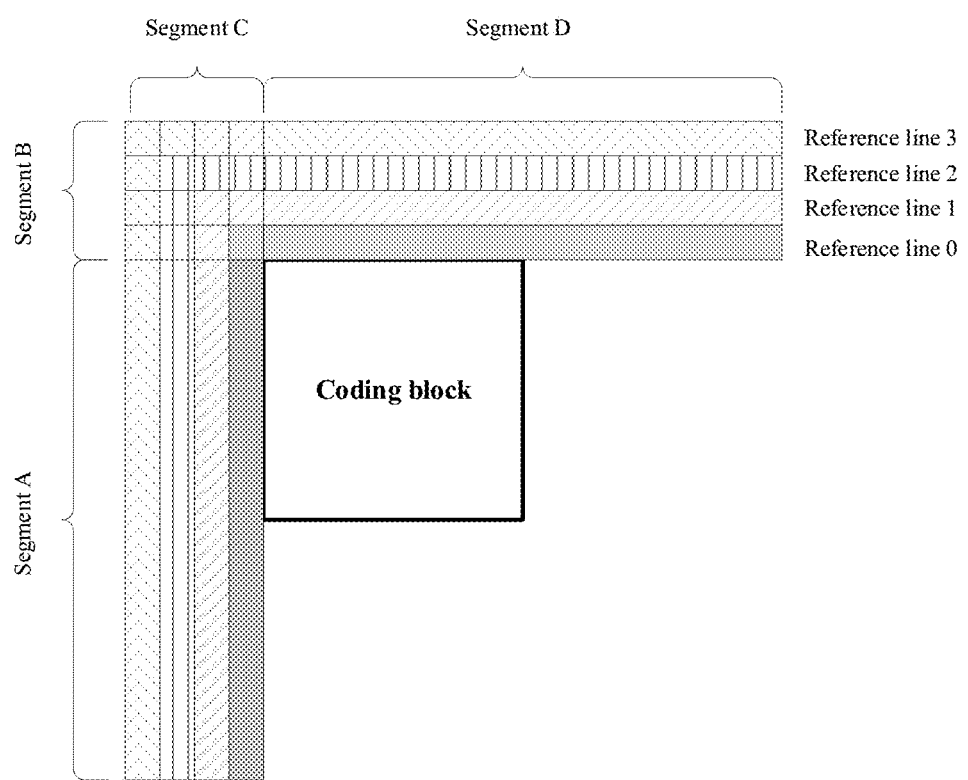
FIG. 16 illustrates an example of 4 reference lines consistent with embodiments of the present disclosure.

The MRLP uses multiple reference lines for the intra prediction, and the video encoder 400 as shown in FIG. 4 decides and signals which reference line is used to generate the intra predictor. The index number of the reference line is signaled preceding the intra prediction modes, and only the most probable modes (MPM) or equivalent are allowed in case the index number of a non-zero reference line is signaled. FIG. 16 illustrates an example of 4 reference lines consistent with embodiments of the present disclosure. As shown in FIG. 16, an example of 4 reference lines is depicted, where each reference line is composed of six segments, i.e., Segments A to F, together with the top-left reference sample. In addition, Segments A and F are padded with the closest samples from Segments B and E, respectively.

As shown in FIG. 16, the index number of the reference line sequentially increases as the reference line is further away from the current CB. The reference line immediately adjacent to the current block is called an adjacent reference line and has the index number equal to zero, which is Reference line 0 in FIG. 16. The reference line with the index number greater than zero is called non-adjacent reference line.

Returning to FIG. 6, at S640, the current frame is coded by using the residual block for each CB of the current frame to generate a bitstream including the coded residual block for each CB. The residual block obtained by using the MRLP to each CB is transformed and quantized. Large block-size transforms include up to 64×64 in size. High frequency transform coefficients are zeroed out for the transform blocks with size equal to 64, so that only the lower-frequency coefficients are retained. When transforming a large block in the transform skip mode, the entire block is used without zeroing out any values. Further, multiple transform selection (MTS) is supported for core transform. To control the MTS, separate enabling flags are used at a sequence parameter set (SPS) level for intra and inter prediction, respectively. When the MTS is enabled at the SPS level, a CU level flag is signaled to indicate whether the MTS is applied or not. Other transform features may be supported, such as low-frequency non-separable transform (LFNST) and sub-block transform (SBT).

Further, a maximum of 63 quantization parameters (QPs) is supported by the transforming and quantizing process. A flexible luma-to-chroma QP mapping is also supported by signaling the luma-to-chroma mapping relationship in the SPS. The CU-level QP adaption where delta QP values for luma and chroma components can be signaled separately may also be supported. Other quantization features, such as dependent quantization may also be supported.

Further, the transformed and quantized residual block is entropy coded. The entropy coding algorithm may be Context-based Adaptive Binary Arithmetic Coding (CABAC). A CABAC coding engine may be used to encode syntax elements outputted by the transforming and quantizing process. The CABAC coding engine supports arithmetic coding algorithms such as Golomb-Rice coding algorithm. Separate residual coding structures may be supported for a transform block and a transform skip block. The transform coefficients of a coding block may be coded by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

Further, a bitstream including the entropy coded residual block for each CB is generated. As a result of entropy coding, the bitstream including the entropy coded residual block for each CB is generated. The bitstream may be transmitted and/or stored. A video decoder may perform a video decoding method corresponding to the video encoding method consistent with the present disclosure to restore the original video.

Accordingly, the present disclosure provides a video encoding method. The method selects multiple reference lines in intra prediction and determines values of reference samples of reference lines selected for multiple reference line intra prediction. The values of the reference samples of the selected reference lines are stored in a line buffer. The reference line selection and the reference sample value determination are optimized to reduce the size of the line buffer. Thus, an on-chip circuit area dedicated to the line buffer is reduced to save the hardware cost.

The embodiments of the encoders and decoders consistent with the present disclosure may be implemented by processing circuitry (e.g., one or more processors or one or more integrated circuits), which executes program instructions stored in a non-transitory computer-readable storage medium.

Figure 17:
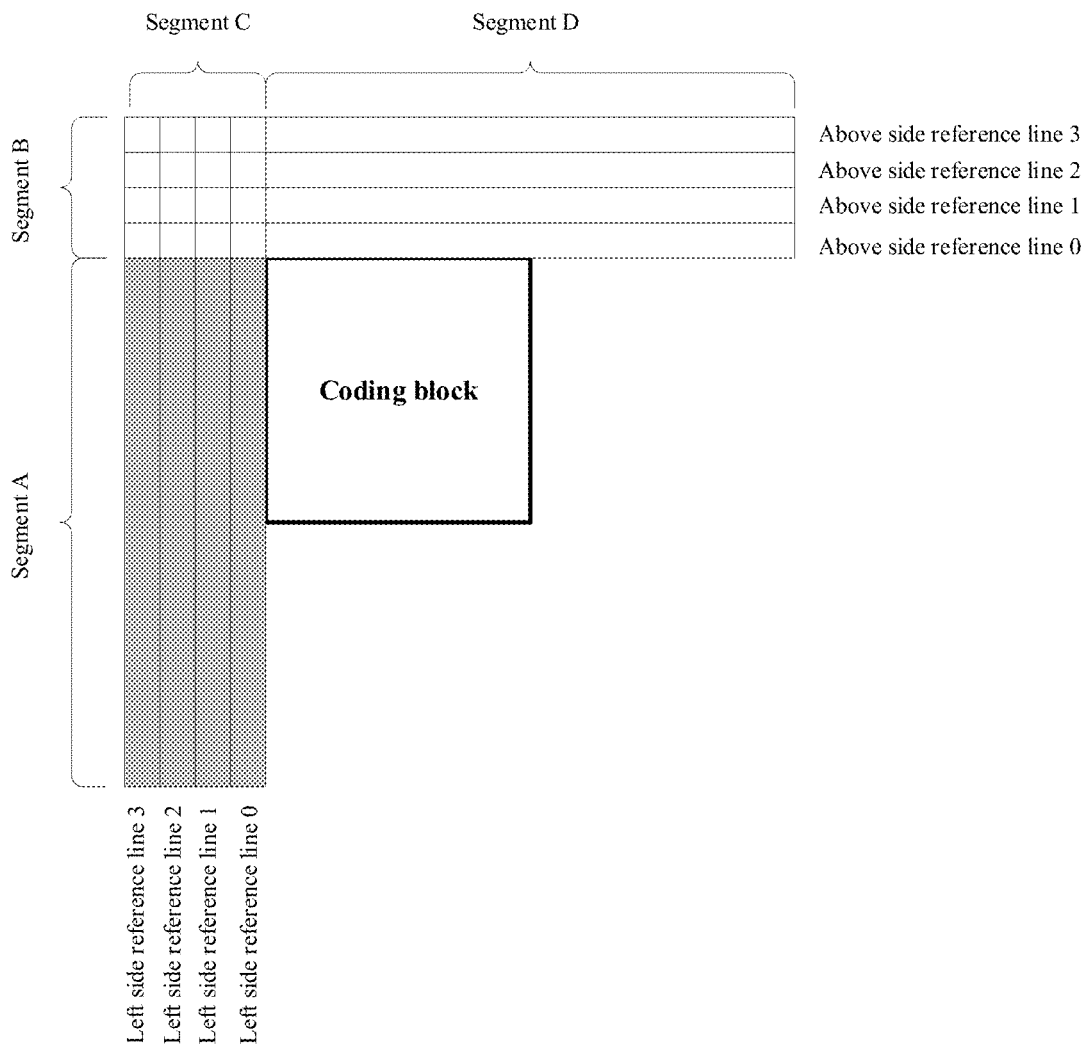
FIG. 17 illustrates an example of above-side reference lines and left-side reference lines consistent with embodiments of the present disclosure.
Figure 18:
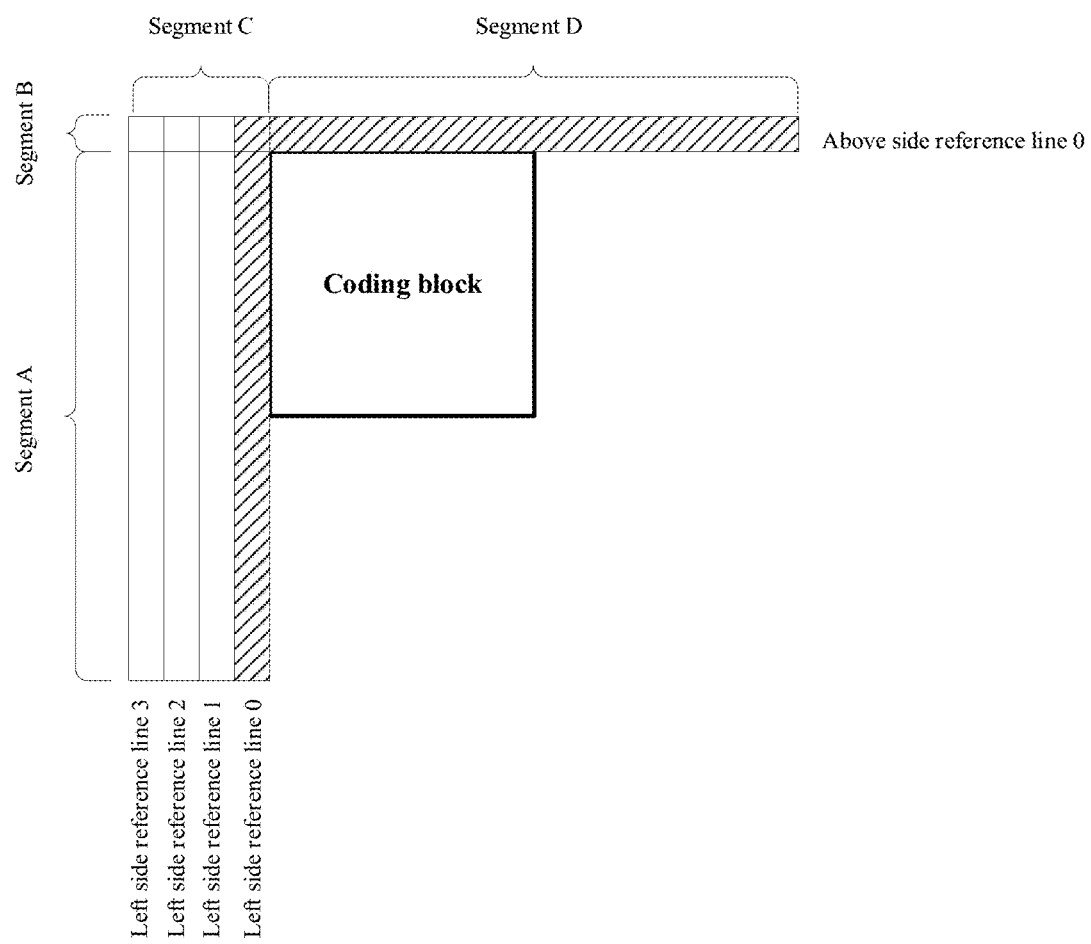
FIG. 18 illustrates an example of selecting the above-side reference line 0 and the left-side reference line 0 for intra prediction consistent with embodiments of the present disclosure.
Figure 19:
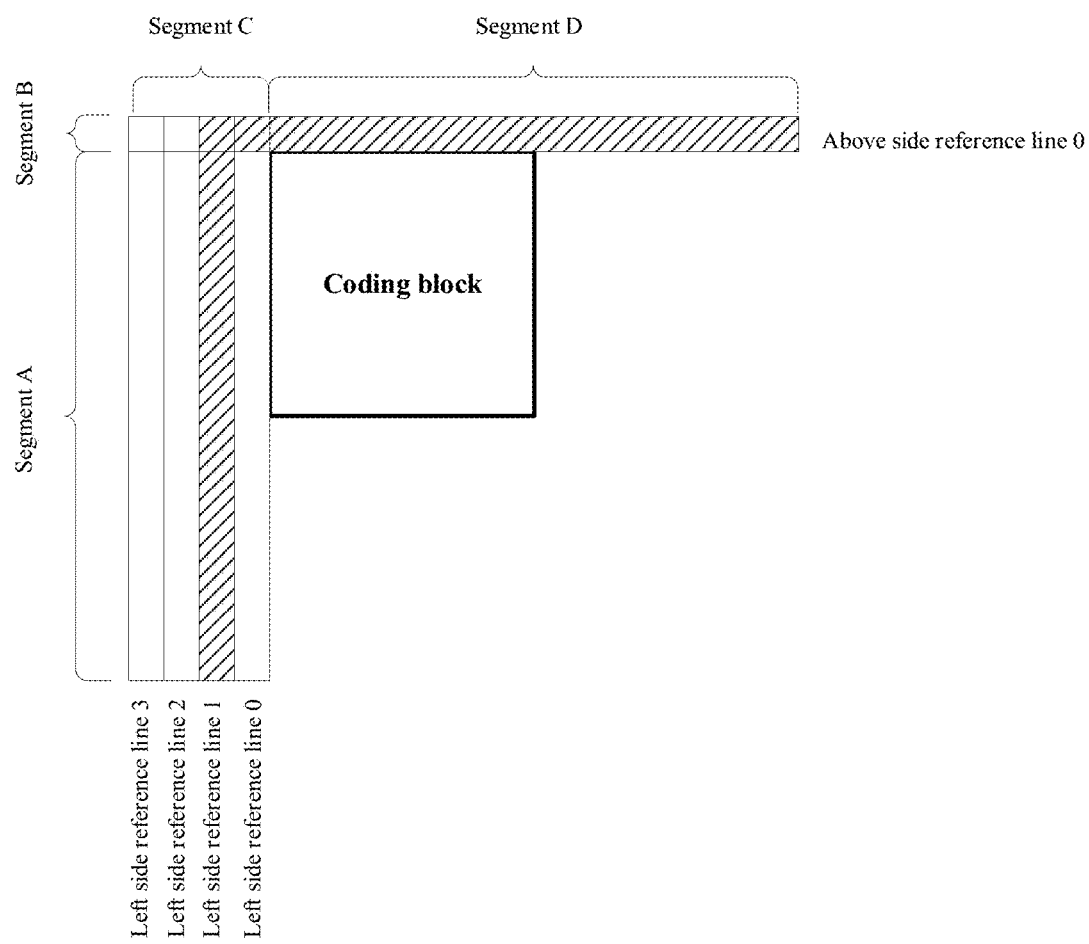
FIG. 19 illustrates an example of selecting the above-side reference line 0 and the left-side reference line 1 for intra prediction consistent with embodiments of the present disclosure.
Figure 20:
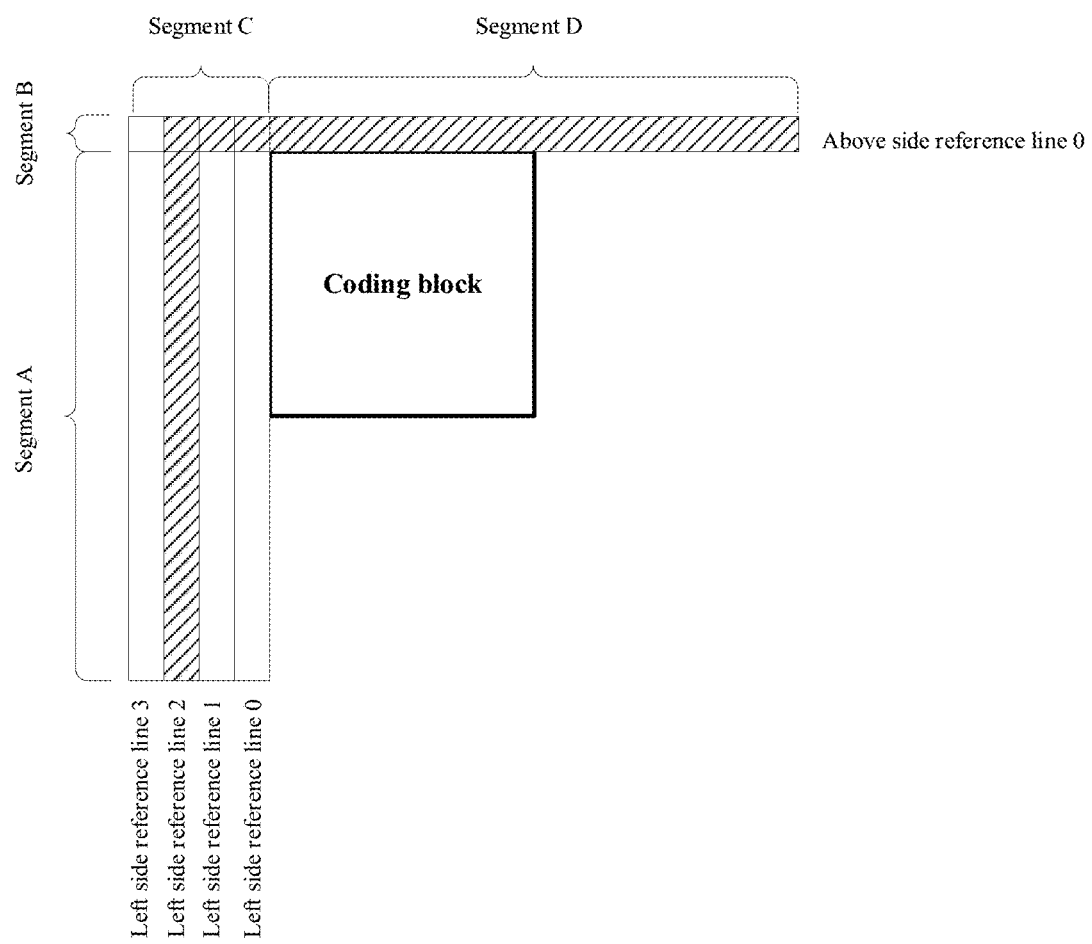
FIG. 20 illustrates an example of selecting the above-side reference line 0 and the left-side reference line 2 for intra prediction consistent with embodiments of the present disclosure.
Figure 21:
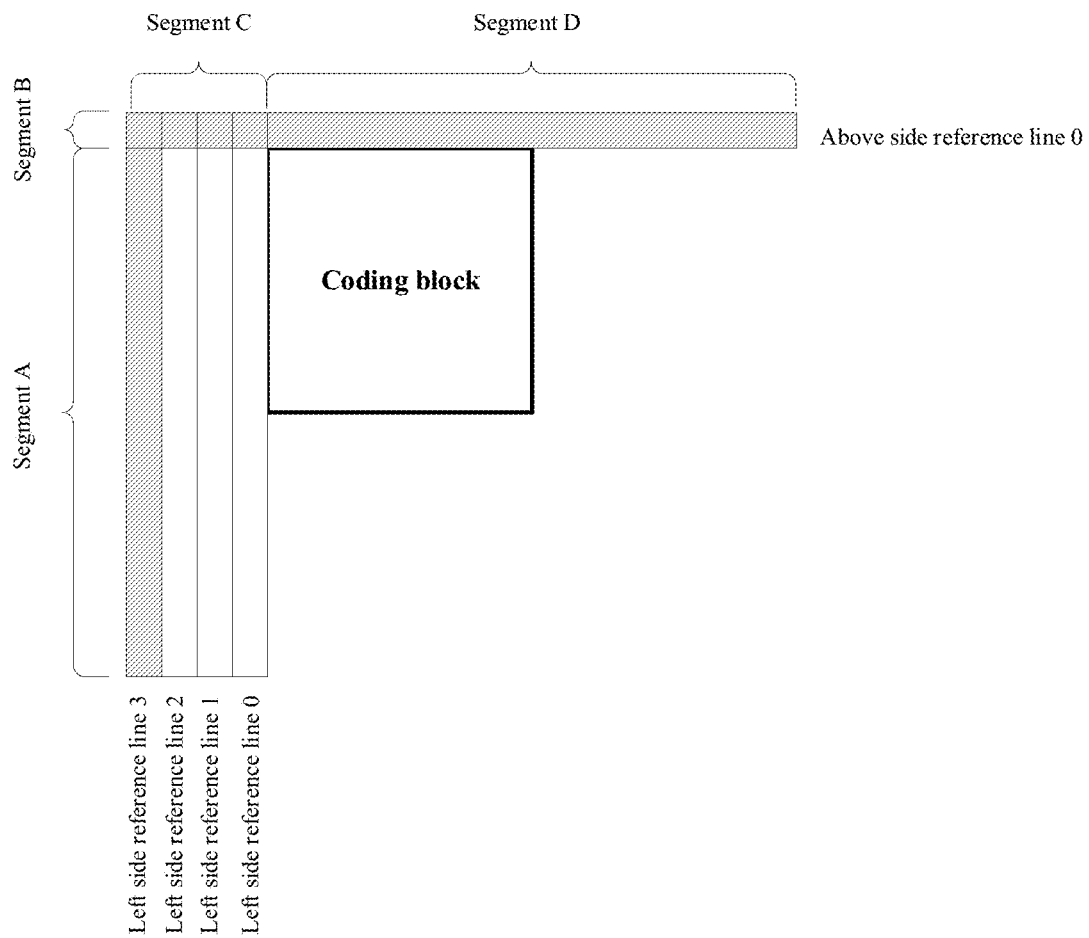
FIG. 21 illustrates an example of selecting the above-side reference line 0 and the left-side reference line 3 for intra prediction consistent with embodiments of the present disclosure.

FIG. 17 illustrates an example of above-side reference lines and left-side reference lines consistent with embodiments of the present disclosure. As shown in FIG. 17, multiple reference lines are further split into above-side reference lines and left-side reference lines. The above-side reference lines are marked in white and reference samples in segment B, C, and D are included in the above-side reference lines. The left-side reference lines are marked in grey, and reference samples in segment A are included in the left-side reference lines.

When the first line of a super block is located inside a current CB, i.e., the current CB is located at the top boundary of the super block, the reference samples of the adjacent above-side reference line (also known as the above-side reference line 0) are used for intra prediction of the current CB and the reference samples of the non-adjacent above-side reference lines are excluded for intra prediction of the current CB. On the other hand, both the reference samples of the adjacent left-side reference line and the non-adjacent left-side reference lines may be used for intra prediction of the current CB. The index numbers of the reference lines are signaled in the same way regardless of whether the first line of the super block is located inside the current CB or not. Further, the context for signaling the index numbers of the reference lines depends on whether the first line of the super block is located inside the current CB or not.

In one embodiment, when the first line of the super block is located inside the current CB, the combination of the adjacent above-side reference line and various left-side reference lines may form various reference samples for intra prediction of the current CB. The combination is signaled by the second index numbers of the reference lines selected for intra prediction. FIGS. 18-21 illustrate examples of selecting the above-side reference line 0 and different left-side reference line for intra prediction consistent with embodiments of the present disclosure. In one example, the combination of the adjacent above-side reference line and the adjacent left-side reference line is marked with diagonal textured patterns in FIG. 18. In another example, the combination of the adjacent above-side reference line and the left-side reference line 1 is marked with diagonal textured patterns in FIG. 19. In another example, the combination of the adjacent above-side reference line and the left-side reference line 2 is marked with diagonal textured patterns in FIG. 20. In another example, the combination of the adjacent above-side reference line and the left-side reference line 3 is marked with diagonal textured patterns in FIG. 21.

When the reference samples are absent in any of the above-side reference lines or the left-side reference lines, a same reference sample padding process is used for both the above-side reference lines and the left-side reference lines.

Smooth filters are used for filtering the reference samples of the reference lines selected for intra prediction. Different smooth filters for the reference samples are used for different reference lines selected for intra prediction. In one example, when the left-side reference line selected for intra prediction is a non-adjacent left-side reference line, the smooth filters are disabled for both the adjacent above-side reference line and the non-adjacent left-side reference selected for intra prediction. In another example, when the left-side reference line selected for intra prediction is the adjacent left-side reference line, the smooth filters are disabled for only the adjacent left-side reference selected for intra prediction.

In one embodiment, when the first line of the super block is inside current CB and a reference line index r is signaled indicating that the rth non-adjacent reference line is being used for intra prediction, the reference sample from the left side is selected from the rth column same as the normal MRLP scheme does, the reference sample from the top side is filled with one single value.

In one embodiment, when the first line of the super block is located inside the current CB, one non-adjacent above-side reference line with a second index number r and one non-adjacent left-side reference line with the same second index number r are selected for intra prediction. In addition, the reference samples of the non-adjacent above-side reference line with the second index number r are set to a single value. In one example, the single value is determined by selecting the value of a reference sample from the adjacent above-side or left-side reference line. In another example, the single value is determined by selecting 1<<(BitDepth−1) or (1<<(BitDepth−1))−1, where BitDepth is the number of bits used for encoding a reference sample.

In one embodiment, when the first line of the CTU is located inside the current CB, one non-adjacent above-side reference line with the second index number r and one non-adjacent left-side reference line with the same second index number r are selected for intra prediction are selected. In addition, values of the reference samples of the non-adjacent above-side reference line with the second index number r are determined by projecting positions of the reference samples of the adjacent above-side reference line to the non-adjacent above-side reference line with the second index number r in a direction of angular intra prediction.

Figure 22:
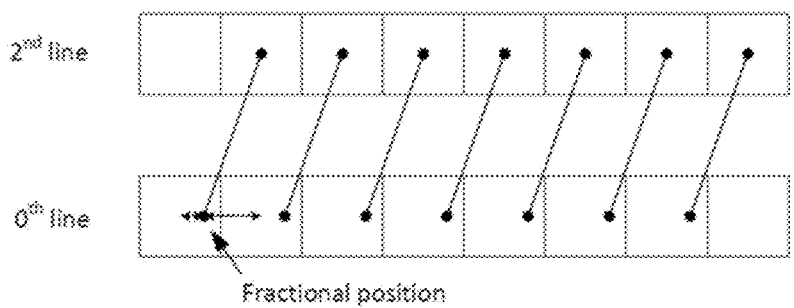
FIG. 22 illustrates an example of projecting integer positions of the reference samples of the non-adjacent above-side reference line toward the adjacent above-side reference line in a direction of angular intra prediction consistent with embodiments of the present disclosure.

The values of the reference samples of the non-adjacent above-side reference line with the second index number r by projecting the positions of the reference samples of the adjacent above-side reference line to the non-adjacent above-side reference line with the second index number r in the direction of angular intra prediction may be determined by the following processes. At first, parallel lines are drawn starting from integer positions of the reference samples of the above-side reference line with the second index number r in the direction of the angular intra prediction toward the adjacent above-side reference line. As shown in FIG. 22, the parallel lines intercept with the adjacent above-side reference line at fractional positions of the reference samples of the adjacent above-side reference line. Then, an interpolation filtering process is applied to the values at the fractional positions of the reference samples of the adjacent above-side reference line to derive the values of the reference samples of the non-adjacent above-side reference line with the second index number r. An interpolation filter used in the interpolation filtering process may be a 2-tap filter, 4-tap filter, or a 6-tap filter. The interpolation filter may include negative filtering coefficients. Alternatively, the interpolation filter may be a 4-tap cubic filter, a 4-tap discrete cosine transform interpolation filter (DCT-IF), or a 2-tap bi-linear filter.

In another embodiment, after the parallel lines intercept with the adjacent above-side reference line at the fractional positions of the reference samples of the adjacent above-side reference line, the integer positions nearest to the fractional positions are used to select the reference samples of the adjacent above-side reference line for intra prediction.

In various embodiments of the present disclosure, the video encoding method selects multiple reference lines in intra prediction and determines values of reference samples of reference lines selected for multiple reference line intra prediction. The values of the reference samples of the selected reference lines are stored in a line buffer. The reference line selection and the reference sample value determination are optimized to reduce the size of the line buffer. Thus, an on-chip circuit area dedicated to the line buffer is reduced to save the hardware cost.

Figure 7:
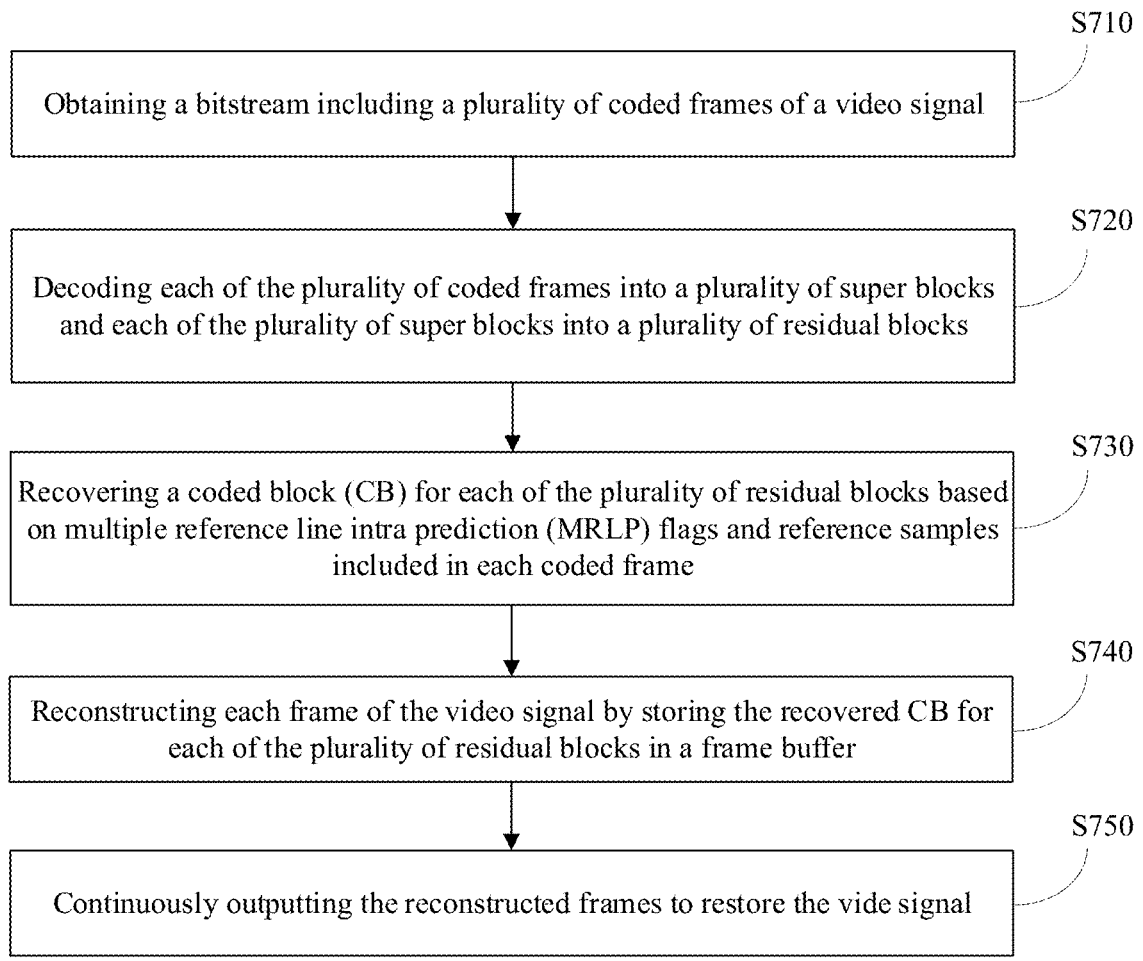
FIG. 7 illustrates an exemplary video decoding method consistent with embodiments of the present disclosure.

The present disclosure also provides a video decoding method. FIG. 7 illustrates an exemplary video decoding method consistent with embodiments of the present disclosure. As shown in FIG. 7, a bitstream including a plurality of coded frames of a video input is obtained (at S710). The bitstream may be generated by a video encoding system performing the video encoding method as shown in FIG. 6.

At S720, each of the plurality of coded frames is decoded into a plurality of super blocks and each of the plurality of super blocks is decoded into a plurality of residual blocks. The bitstream includes header information to indicate the boundaries of the plurality of super blocks and the boundaries of the plurality of residual blocks contained in each of the plurality of super blocks. Each of the plurality of residual blocks may be entropy coded. An entropy decoding process followed by an inverse transform and inverse quantization process may be performed to obtain each of the plurality of residual blocks. The entropy decoding process and the inverse transform and inverse quantization process reverses the entropy coding process and the transform and the quantization process performed at S640 of the video encoding method shown in FIG. 6.

At S730, a coding block for each of the plurality of residual blocks is recovered based on MRLP flags and reference samples included in each coded frame. Specifically, the CB is decoded from the corresponding residual block by reversing the MRLP process based on the MRLP flags and the reference samples included in each coded frame, which are determined at S630 of the video encoding method shown in FIG. 6.

Then, the recovered CB for each of the plurality of residual blocks in each of the plurality of super blocks is stored in a frame buffer to reconstruct each frame of the video signal (at S740). This process assembles a plurality of CBs into a super block and a plurality of super blocks into a frame of the video signal by reversing S620 of the video encoding method shown in FIG. 6.

Finally, the assembled frames are outputted continuously to restore the video signal (at S750). This process reverses S610 of the video encoding method shown in FIG. 6.

In the embodiments of the present disclosure, the video encoding method and the corresponding video decoding method select multiple reference lines in intra prediction and determine values of reference samples of reference lines selected for multiple reference line intra prediction. The values of the reference samples of the selected reference lines are stored in a line buffer. The reference line selection and the reference sample value determination are optimized to reduce the size of the line buffer. Thus, an on-chip circuit area dedicated to the line buffer is reduced to save the hardware cost.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A video decoding method, comprising:
   obtaining a bitstream including a plurality of coded frames of a video signal;
   decoding each of the plurality of coded frames into a plurality of super blocks and each of the plurality of super blocks into a plurality of residual blocks;
   recovering a coded block (CB) for each of the plurality of residual blocks based on multiple reference line intra prediction (MRLP) flags and reference samples included in each coded frame, wherein multiple reference lines are divided into above-side reference lines and left-side reference lines, and one above-side reference line and one left-side reference line are selected for intra prediction, wherein:
      each of the above-side reference lines and the left-side reference lines is identified by a second index number and the second index number sequentially increases in a direction facing away from a current CB;
      the above-side reference line immediately adjacent to the current CB is called the adjacent above-side reference line and other above-side reference lines are called non-adjacent above-side reference lines;
      the left-side reference line immediately adjacent to the current CB is called the adjacent left-side reference line and other left-side reference lines are called non-adjacent left-side reference lines; and
      the intra prediction is performed by: determining a first line of a super block is located inside the current CB; and excluding reference samples of the non-adjacent above-side reference lines for an intra prediction of the current CB, while including reference samples of the adjacent above-side reference line for the intra prediction of the current CB;
   reconstructing each frame of the video signal by storing the recovered CB for each of the plurality of residual blocks in a frame buffer; and
   continuously outputting the reconstructed frames to restore the video signal.

2. The method according to claim 1, wherein selecting one above-side reference line and one left-side reference line for intra prediction includes:
   selecting the adjacent above-side reference line and one of the left-side reference lines for intra prediction.

3. The method according to claim 2, wherein:
   when reference samples are absent in any of the above-side reference lines or the left-side reference lines, a same reference sample padding process is used for both the above-side reference lines and the left-side reference lines.

4. The method according to claim 2, wherein:
   different smooth filters for the reference samples are used for different reference lines selected for intra prediction.

5. The method according to claim 1, wherein selecting one above-side reference line and one left-side reference for intra prediction includes:
   selecting one non-adjacent above-side reference line and one non-adjacent left-side reference line for intra prediction.

6. The method according to claim 1, wherein selecting one above-side reference line and one left-side reference for intra prediction includes:

selecting one non-adjacent above-side reference line with a second index number r and one non-adjacent left-side reference line with the same second index number r for intra prediction; and determining values of reference samples of the non-adjacent above-side reference line with the second index number r by projecting positions of the reference samples of the adjacent above-side reference line to the non-adjacent above-side reference line with the second index number r in a direction of angular intra prediction.

7. The method according to claim 6, wherein determining the values of the reference samples comprises:

drawing parallel lines starting from integer positions of the reference samples of the above-side reference line with the second index number r in the direction of the angular intra prediction toward the adjacent above-side reference line.

8. The method according to claim 7, wherein determining the values of the reference samples further comprises:

intercepting with the adjacent above-side reference line at fractional positions of the reference samples of the adjacent above-side reference line.

9. The method according to claim 1, further comprising:

identifying a top reference sample from the adjacent above-side reference line, the top reference sample being in a same column with a current pixel of the coding block;

identifying a left reference sample from the adjacent left-side reference line, the left reference sample being in a same row with the current pixel;

identifying a top-left reference sample, the top-left reference sample being a same row with the top reference sample and being in a same column with the left reference sample; and setting an average of the top reference sample, the left reference sample, and the top-left reference sample as a predictor of the current pixel of the coding block.

10. The method according to claim 1, further comprising:

in response to determining a non-adjacent left-side reference line is selected, disabling smooth filters for both the adjacent above-side reference line and the non-adjacent left side reference line; and in response to determining the adjacent left-side reference line is selected, disabling the smooth filters only for the adjacent left-side reference line but not for the adjacent above-side reference line.

11. A video encoding method, comprising:

obtaining a current frame of a video input;

according to a nested multi-type tree coding block structure, dividing the obtained current frame into a sequence of super blocks, and splitting each super block into a plurality of coded blocks (CBs);

using multiple reference line intra prediction (MRLP) to obtain a residual block for each CB and storing MRLP flags and reference samples of reference lines selected for intra prediction in a line buffer, wherein multiple reference lines are divided into above-side reference lines and left-side reference lines and one above-side reference line and one left-side reference are selected for intra prediction to minimize the size of the line buffer, wherein:

each of the above-side reference lines and the left-side reference lines is identified by a second index number and the second index number sequentially increases in a direction facing away from a current CB;

the above-side reference line immediately adjacent to the current CB is called the adjacent above-side reference line and other above-side reference lines are called non-adjacent above-side reference lines;

the left-side reference line immediately adjacent to the current CB is called the adjacent left-side reference line and other left-side reference lines are called non-adjacent left-side reference lines; and the intra prediction is performed by: determining a first line of a super block is located inside the current CB; and excluding reference samples of the non-adjacent above-side reference lines for an intra prediction of the current CB, while including reference samples of the adjacent above-side reference line for the intra prediction of the current CB; and coding the current frame by using the residual block for each CB of the current frame to generate a bitstream including the coded residual block for each CB.

12. The method according to claim 11, wherein selecting one above-side reference line and one left-side reference line for intra prediction includes:

selecting the adjacent above-side reference line and one of the left-side reference lines for intra prediction.

13. The method according to claim 12, wherein:

when reference samples are absent in any of the above-side reference lines or the left-side reference lines, a same reference sample padding process is used for both the above-side reference lines and the left-side reference lines.

14. The method according to claim 12, wherein:

different smooth filters for the reference samples are used for different reference lines selected for intra prediction.

15. A video decoding apparatus, comprising: a memory storing computer program instructions; and a processor coupled to the memory and configured to execute the computer program instructions and perform:

obtaining a bitstream including a plurality of coded frames of a video signal;

decoding each of the plurality of coded frames into a plurality of super blocks and each of the plurality of super blocks into a plurality of residual blocks;

recovering a coded block (CB) for each of the plurality of residual blocks based on multiple reference line intra prediction (MRLP) flags and reference samples included in each coded frame, wherein multiple reference lines are divided into above-side reference lines and left-side reference lines and one above-side reference line and one left-side reference line are selected for intra prediction, wherein:

each of the above-side reference lines and the left-side reference lines is identified by a second index number and the second index number sequentially increases in a direction facing away from a current CB;

the above-side reference line immediately adjacent to the current CB is called the adjacent above-side reference line and other above-side reference lines are called non-adjacent above-side reference lines;

the left-side reference line immediately adjacent to the current CB is called the adjacent left-side reference line and other left-side reference lines are called non-adjacent left-side reference lines; and the intra prediction is performed by: determining a first line of a super block is located inside the current CB; and excluding reference samples of the non-adjacent above-side reference lines for an intra prediction of the current CB, while including reference samples of the adjacent above-side reference line for the intra prediction of the current CB;

reconstructing each frame of the video signal by storing the recovered CB for each of the plurality of residual blocks in a frame buffer; and continuously outputting the reconstructed frames to restore the video signal.

\* \* \* \* \*